(12) United States Patent
Oliver et al.

(10) Patent No.: US 8,429,744 B1
(45) Date of Patent: Apr. 23, 2013

(54) SYSTEMS AND METHODS FOR DETECTING MALFORMED ARGUMENTS IN A FUNCTION BY HOOKING A GENERIC OBJECT

(75) Inventors: Ian Oliver, Manly Vale (AU); Subhash Gaonkar, Wentworthville (AU)

(73) Assignee: Symantec Corporation, Mountain View, CA (US)

( * ) Notice: Subject to any disclaimer, the term of this patent is extended or adjusted under 35 U.S.C. 154(b) by 156 days.

(21) Appl. No.: 12/968,486

(22) Filed: Dec. 15, 2010

(51) Int. Cl.
*G06F 21/00* (2006.01)

(52) U.S. Cl.
USPC ............. 726/22; 726/23; 726/24; 726/25

(58) Field of Classification Search ............ 726/22, 726/23, 24, 25
See application file for complete search history.

(56) References Cited

U.S. PATENT DOCUMENTS

| | | | | |
|---|---|---|---|---|
| 7,600,231 | B2* | 10/2009 | Furuichi et al. | 719/312 |
| 7,870,610 | B1* | 1/2011 | Mitchell et al. | 726/23 |
| 2001/0014921 | A1* | 8/2001 | Kimura et al. | 710/8 |
| 2003/0138765 | A1* | 7/2003 | Bowers | 434/322 |
| 2003/0200485 | A1* | 10/2003 | Achtelstetter | 714/37 |
| 2004/0093587 | A1* | 5/2004 | Sesma | 717/118 |
| 2004/0148307 | A1* | 7/2004 | Rempell | 707/102 |
| 2005/0026130 | A1* | 2/2005 | Crowhurst et al. | 434/362 |
| 2006/0101413 | A1* | 5/2006 | Kinno et al. | 717/127 |
| 2006/0149746 | A1* | 7/2006 | Bansod et al. | 707/10 |
| 2006/0200523 | A1* | 9/2006 | Tokuda et al. | 709/206 |
| 2006/0200530 | A1* | 9/2006 | Tokuda et al. | 709/206 |
| 2006/0200531 | A1* | 9/2006 | Tokuda et al. | 709/206 |
| 2007/0005702 | A1* | 1/2007 | Tokuda et al. | 709/206 |
| 2007/0113282 | A1* | 5/2007 | Ross | 726/22 |
| 2008/0126943 | A1* | 5/2008 | Parasnis et al. | 715/730 |
| 2010/0023810 | A1* | 1/2010 | Stolfo et al. | 714/38 |
| 2010/0031359 | A1* | 2/2010 | Alme | 726/24 |
| 2010/0037033 | A1* | 2/2010 | Karecha et al. | 711/217 |
| 2010/0115620 | A1* | 5/2010 | Alme | 726/24 |
| 2010/0115621 | A1* | 5/2010 | Staniford et al. | 726/25 |
| 2010/0153785 | A1* | 6/2010 | Keromytis et al. | 714/38 |
| 2010/0205674 | A1* | 8/2010 | Zorn et al. | 726/25 |
| 2010/0281540 | A1* | 11/2010 | Alme | 726/23 |
| 2010/0325733 | A1* | 12/2010 | Honda | 726/26 |
| 2010/0332920 | A1* | 12/2010 | Ashida et al. | 714/57 |
| 2011/0191848 | A1* | 8/2011 | Zorn et al. | 726/22 |

\* cited by examiner

*Primary Examiner* — Edan Orgad
*Assistant Examiner* — Bradley Holder
(74) *Attorney, Agent, or Firm* — Holland & Hart LLP

(57) ABSTRACT

A computer-implemented method to detect malformed arguments in a function by hooking a generic object, is described. A predetermined argument to monitor is identified. An activity associated with a calling of a function to produce a called out function is detected. The called out function is mapped to a class identification of an object. An argument in the called out function is compared with the predetermined argument. When a match exists, a virtual method table identification is recorded for the called out function. The match between the argument in the called out function and the predetermined argument is reported.

14 Claims, 6 Drawing Sheets

SYSTEMS AND METHODS FOR DETECTING MALFORMED ARGUMENTS IN A FUNCTION BY HOOKING A GENERIC OBJECT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone who uses and relies on computers.

Computing systems may be capable of accessing information across a network connection. For example, a computing system may access information from the World Wide Web. This information may be accessed by using a web browser to locate a desired website that includes the information. Developers of malware, however, may engage a script attack that affects the functionality of the web browser or other functions of the computing system. These attacks may be result of a malformed argument being called into a function. As a result, benefits may be realized by providing system and methods to detect malformed arguments in a function by hooking a generic object.

SUMMARY

According to at least one embodiment, a computer-implemented method to detect malformed arguments in a function by hooking a generic object, is described. A predetermined argument to monitor is identified. An activity associated with a calling of a function to produce a called out function is detected. The called out function is mapped to a class identification of an object. An argument in the called out function is compared with the predetermined argument. When a match exists, a virtual method table identification is recorded for the called out function. The match between the argument in the called out function and the predetermined argument is reported.

In one embodiment, the predetermined argument includes a no-operation performed (NOP) sled. In one embodiment, the predetermined argument includes shellcode. The called out function may be a JavaScript function. In one example, the JavaScript function may include at least one of the following functions: Unescape, Eval, CharCodeAt, Split, or Char. The called out function may be an invoke function.

In one configuration, an identity of an object and a function associated with the called out function may be recorded. The called out function may be mapped to a class identification of an object that called the function. In one embodiment, the object that called the function may include an IDispatch interface.

A computing device configured to detect malformed arguments in a function by hooking a generic object is also described. The device may include a processor and memory in electronic communication with the processor. The device may further include a protection application configured to identify a predetermined argument to monitor, and detect an activity associated with a calling of a function to produce a called out function. The protection application may be configured to map the called out function to a class identification of an object, and compare an argument in the called out function with the predetermined argument. When a match exists, the protection application may be configured to record a virtual method table identification for the called out function, and report the match between the argument in the called out function and the predetermined argument.

A computer-program product for detecting malformed arguments in a function by hooking a generic object is also described. The computer-program product including a computer-readable medium having instructions thereon. The instructions including code programmed to identify a predetermined argument to monitor, and code programmed to detect an activity associated with a calling of a function to produce a called out function. The instructions may further include ode programmed to map the called out function to a class identification of an object, and code programmed to compare an argument in the called out function with the predetermined argument. When a match exists, the instructions may further include code programmed to record a virtual method table identification for the called out function, and code programmed to report the match between the argument in the called out function and the predetermined argument.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
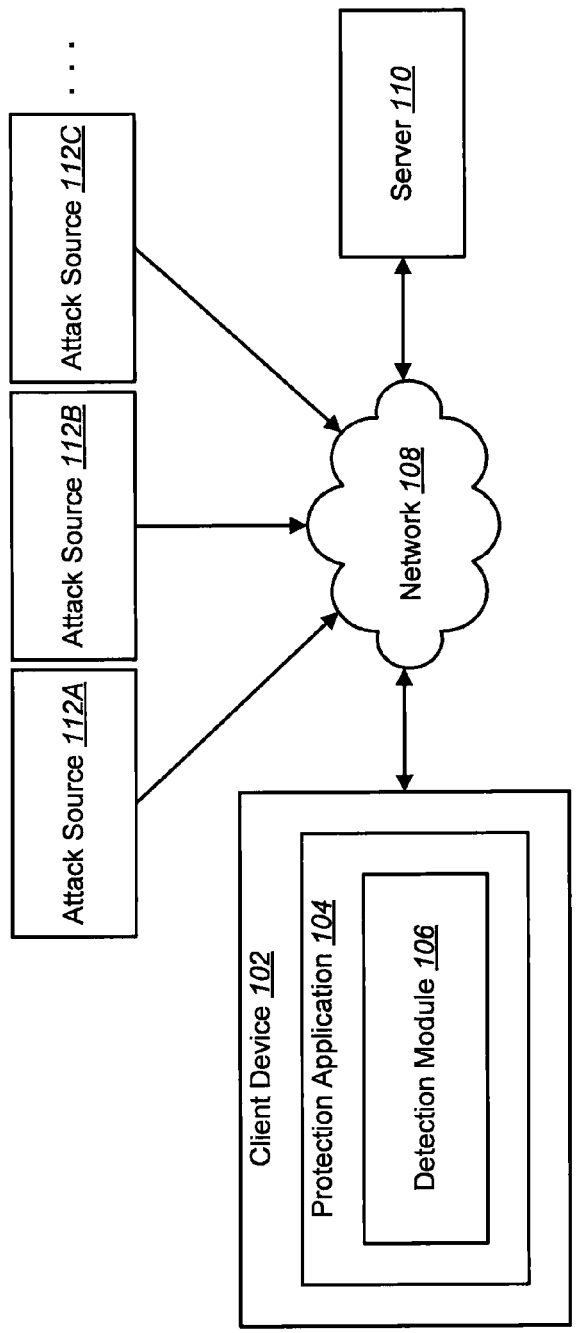
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In computer technology, operation code (opcode) may be the portion of a machine language instruction that specifies the operation to be performed. Opcodes may be found in byte codes and other representations intended for a software interpreter. These software based instruction sets (i.e., opcode sets) may employ higher-level data types and operations than most hardware counterparts. For example, an opcode set may be provided in the JavaScript language. JavaScript may be used to write functions that are embedded in or included from hyper-text markup language (HTML) pages that interact with Document Object Model (DOM) of the page. A web browser is a common host environment for JavaScript. Web browsers may user a public application programming interface (API) to create host objects responsible for reflecting the DOM into JavaScript.

JavaScript may provide the potential for malicious authors to deliver scripts to run on a client computing device via the web. Many browser exploits include no-operation performed (NOP) sleds in these scripts that are delivered to client computing devices via the web. A NOP may be assembly language instructions, sequence of programming language statements, or computer protocol commands that effectively do nothing at all. In some instances, a NOP opcode may be used to form a NOP sled, which may allow code to execute when the exact value of the instruction pointer is indeterminate (e.g., when a buffer overflow causes a function's return address on the stack to be overwritten). In other words, a NOP sled may be a sequence of NOP instructions meant to "slide" a central processing unit's (CPU's) instruction execution flow to its final, desired destination. As a result, NOP sleds may be used in buffer overflows and similar exploits designed to take over a program's execution path.

Objects in web browsers may be attacked by passing malformed arguments into functions. In one example, a malformed argument may include NOP sleds followed by shellcode. Shellcode may be a small piece of code used as the payload in the exploitation of a software vulnerability. In one configuration, the NOP sleds, the shellcode, or both may be detected. Currently, detection systems explicitly hook the object/function combination that is to be monitored. As a result, the current detection systems require a coding effort for each new object/function combination to be monitored. In addition, the current detection systems also require prior knowledge of the attack in order to know which object/function combination to monitor. For example, an object/function combination may be SuperBuddy/LinkSBIcons. In order to detect an attack using the current detection systems, the SuperBuddy object's LinkSBIcons function must be hooked and checked for a NOP sled or shellcode. As an example, the NOP sled may be 0c0c0c0c.

The present systems and methods may check for a previously determined set of NOP sleds at a key gateway through which object/function combinations are called. At this point, arguments to the function may be checked. By checking for a set of NOP sleds at the key gateway, obfuscated script bode may not evade detection and new attacks on objects may be identified. As stated above, current detection systems hook specific object/function combinations and attempt to identify a specific subset of arguments in relation to a known attack.

FIG. 1 is a block diagram illustrating one embodiment of an environment in which the present systems and methods may be implemented. In one configuration, a client device 102 may communicate with a server 110 across a network connection 108. In one example, one or more attacks may be introduced to the client device 102 from an attack source 112A, 112B, 112C. The attacks originating from an attack source 112A, 112B, 112C may disrupt the processing capabilities of the client device 102. In addition, an attack may manipulate data stored on the client device 102.

In one configuration, the client device 102 may include a protection application 104 that may protect the client device 102 from an attack originating from an attack source 112A, 112B, 112C. In one example, the protection application 104 may include a detection module 106 that may detect an attack on the client device 102. The client device 102 may communicate information regarding a detected attack to the server 110. The server may then analyze the information regarding the attack to determine if the attack is malicious or if the attack has been improperly identified by the client device 102 as an attack (i.e., a false positive). In addition, an attacked may be analyzed to identify an object/function combination that has been attacked.

Figure 2:
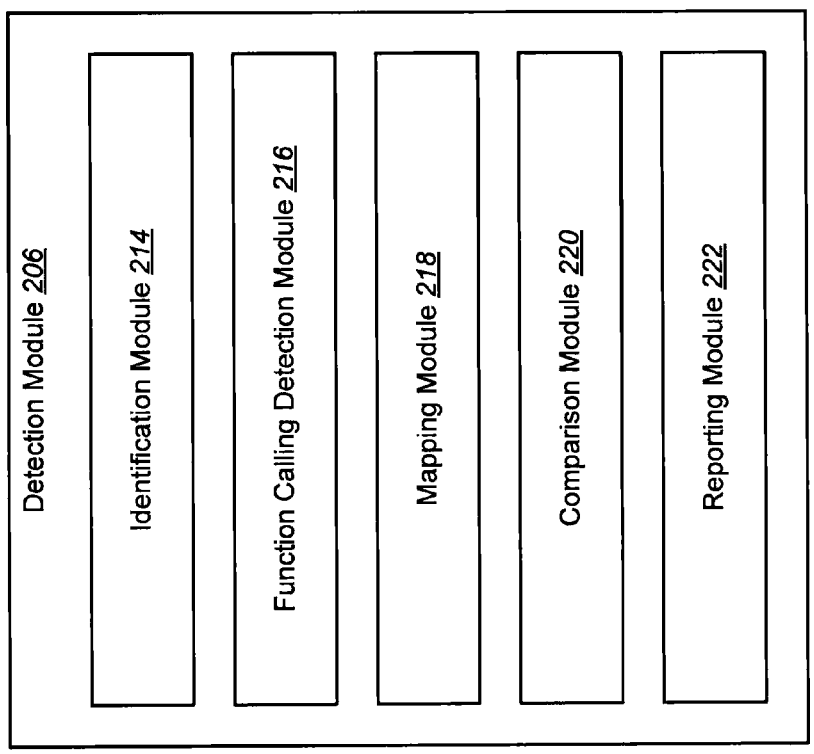
FIG. 2 is a block diagram illustrating one embodiment of a detection module.

FIG. 2 is a block diagram illustrating one embodiment of a detection module 206. In one configuration, the detection module 206 may include an identification module 214, a function calling detection module 216, a mapping module 218, a comparison module 220, and a reporting module 222.

In one embodiment, the identification module 214 may identify a previously determined set of NOP sleds. As previously stated, the present systems and methods may apply a check of previously determined sets of NOP sleds at a key gateway (explained below), through which all functions for all objects may be called. In one example, an object may be created depending on the JavaScript API that is called. For example, ActiveXObjectFncObj may be an interface for an object. When any "ActiveXObject" is created using new ActiveXObject, it may be hooked through an ActiveXObjectFncObj interface in JavaScript. In another example, a CoCreateInstance function may be used to create an object. As another example, CoGetClassObject may be used to create an object.

In one embodiment, the function calling detection module 216 may detect when a particular function has been called. For example, when an object is created using any of the above mentioned interfaces, the function calling detection module 216 may detect when any invoke functions are called on these interfaces for the objects. Parameters or arguments fed to the invoke function may then be checked in accordance with the present systems and methods. In one example, if the ActiveXObjectFncObj is used, the present systems and methods may also detect objects that are created through an object tag in HTML.

As an example, the previously determined NOP sled may be 0c0c0c0c. The identification module 214 may identify this NOP sled as being in an argument of any function of any object. The function calling detection module 216 may identify when an invoke function is called. In one example, IDispatch may be the object that calls the invoke function. From the IDispatch interface, the mapping module 218 may map to a class identification (ID). The comparison module 220 may compare the class ID to the interface that created the object (e.g., ActiveXObjectFncObj, CoCreateInstance, and CoGetClassObject). If the class ID matches the interface that created the object, an attempt is made to match the argument in the invoke function to the previously determined NOP sled (in this example 0c0c0c0c). If the comparison module 220 determines that the class ID matches the previously determined NOP sled, a virtual method table (vtable) function ID is recorded. The reporting module 222 may report a match of 0c0c0c0c on the class ID for the vtable function ID. As a result, the present systems and methods may monitor for 0c0c0c0c (as an example) and other patterns passed to any function of any object. When a match occurs, the reporting module 222 may report the identity of the object/function combination that is attacked.

The present systems and methods may detect additional types of NOP sleds. For example, the NOP sleds the detection module 206 may detect may include, but are not limited to, the following:

{"\x04\x04\x04\x04"},
{"\x05\x05\x05\x05"},
{"\x08\x08\x08\x08"},
{"\x09\x09\x09\x09"},
{"\x0C\x0C\x0C\x0C"},
{"\x0A\x0A\x0A\x0A"},
{"\x0b\x0b\x0b\x0b"},
{"\x0D\x0D\x0D\x0D"},
{"\x90\x90\x90\x90"},
{"\x11\x11\x11\x11"},
{"\x42\x42\x42\x42"},
{"\x43\x43\x43\x43"},
{"\x49\x49\x49\x49"},
{"\x4a\x4a\x4a\x4a"},
{"\x4b\x4b\x4b\x4b"},
{"\x48\x48\x48\x48"},
{"\x41\x41\x41\x41"},
{"\x0b\x0c\x0b\x0c"},
{"\x92\xb2\x1c\x99"},
{"\x0D\x0C\x0D\x0C"},
{"\x97\x97\x97\x97"}.

In one configuration, the first time object/function combinations are called on a unique user machine, an object.function.arg may calculate metrics for the argument for features such as, but not limited to, length and content (i.e., string or binary). In one example, the reporting module 222 may report back this information so that across a large user base, anomalies may be identified in arguments submitted in any function of any object.

Figure 3:
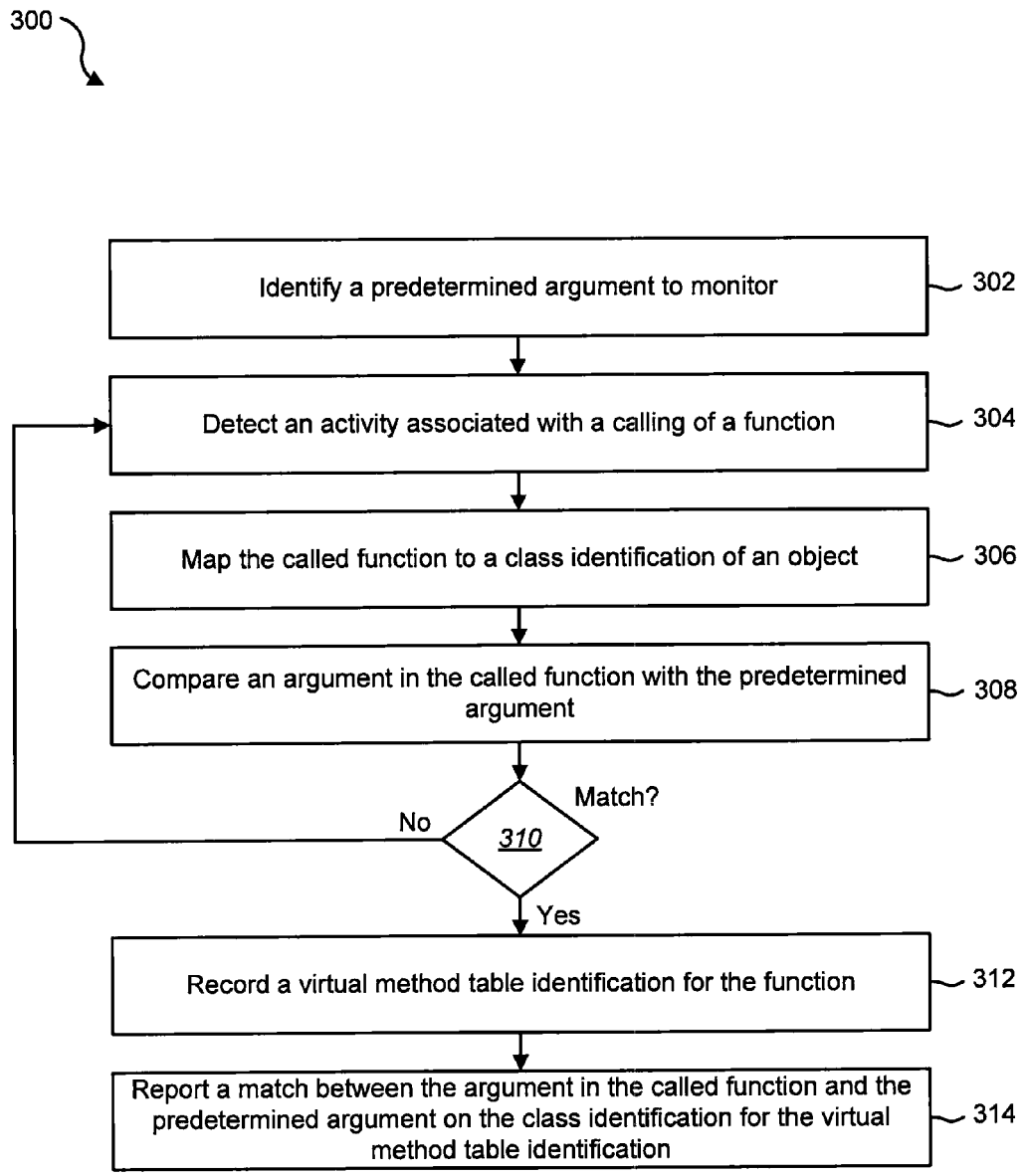
FIG. 3 is a flow diagram illustrating one embodiment of a method to detect malformed arguments in a function.

FIG. 3 is a flow diagram illustrating one embodiment of a method 300 to detect malformed arguments in a function. In one configuration, the method 300 may be implemented by the protection application 104. Examples of malformed arguments may be, but are not limited to, NOP sleds and shellcode.

In one example, a predetermined argument to monitor may be identified 302. The predetermined argument may be a NOP sled. An activity associated with a calling of a function may be detected 304. In one configuration, the called function may be mapped 306 to a class ID of an object. An argument in the called function may be compared 308 with the predetermined argument. In one configuration, a determination 310 may be made as to whether a match exists between the argument in the called function and the predetermined argument. If it is determined 310 that a match does not exist, the method 300 may return to detect 304 an activity associated with a calling of a function. If, however, it is determined 310 that a match does exist, a vtable ID may be recorded 312 for the function. In addition, the match between the argument in the called function and the predetermined argument on the class ID for the vtable ID may be reported 314.

Figure 4:
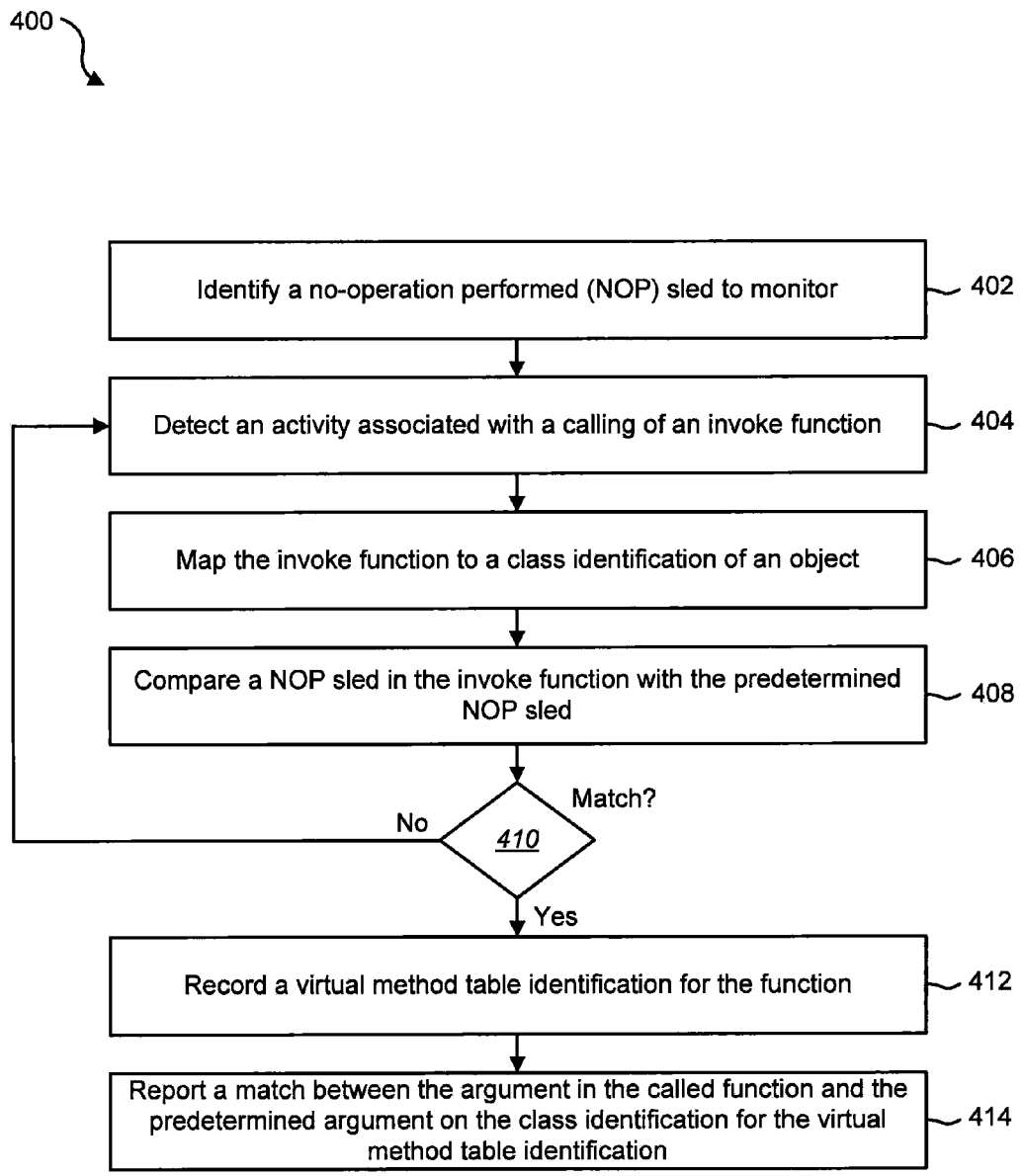
FIG. 4 is a flow diagram illustrating a further embodiment of a method to detect malformed arguments in a function.

FIG. 4 is a flow diagram illustrating a further embodiment of a method 400 to detect malformed arguments in a function. In one configuration, the method 400 may be implemented by the protection application 104. Examples of malformed arguments may be, but are not limited to, NOP sleds and shellcode.

In one embodiment, a NOP sled to monitor may be identified 402. An activity associated with a calling of an invoke function may be detected 404. In one configuration, the invoke function may be mapped 406 to a class ID of an object. A NOP sled in the invoke function may be compared 408 with the predetermined NOP sled. In one example, a determination 410 may be made as to whether a match exists between the NOP sled in the invoke function and the predetermined NOP sled. If it is determined 410 that a match does not exist, the method 400 may return to detect an activity associated with a calling of an invoke function. If, however, it is determined 410 that a match does exist, a vtable ID may be recorded 412 for the function. In addition, the match between the NOP sled in the called functions and the predetermined NOP sled on the class ID for the vtable ID may be reported 414.

Figure 5:
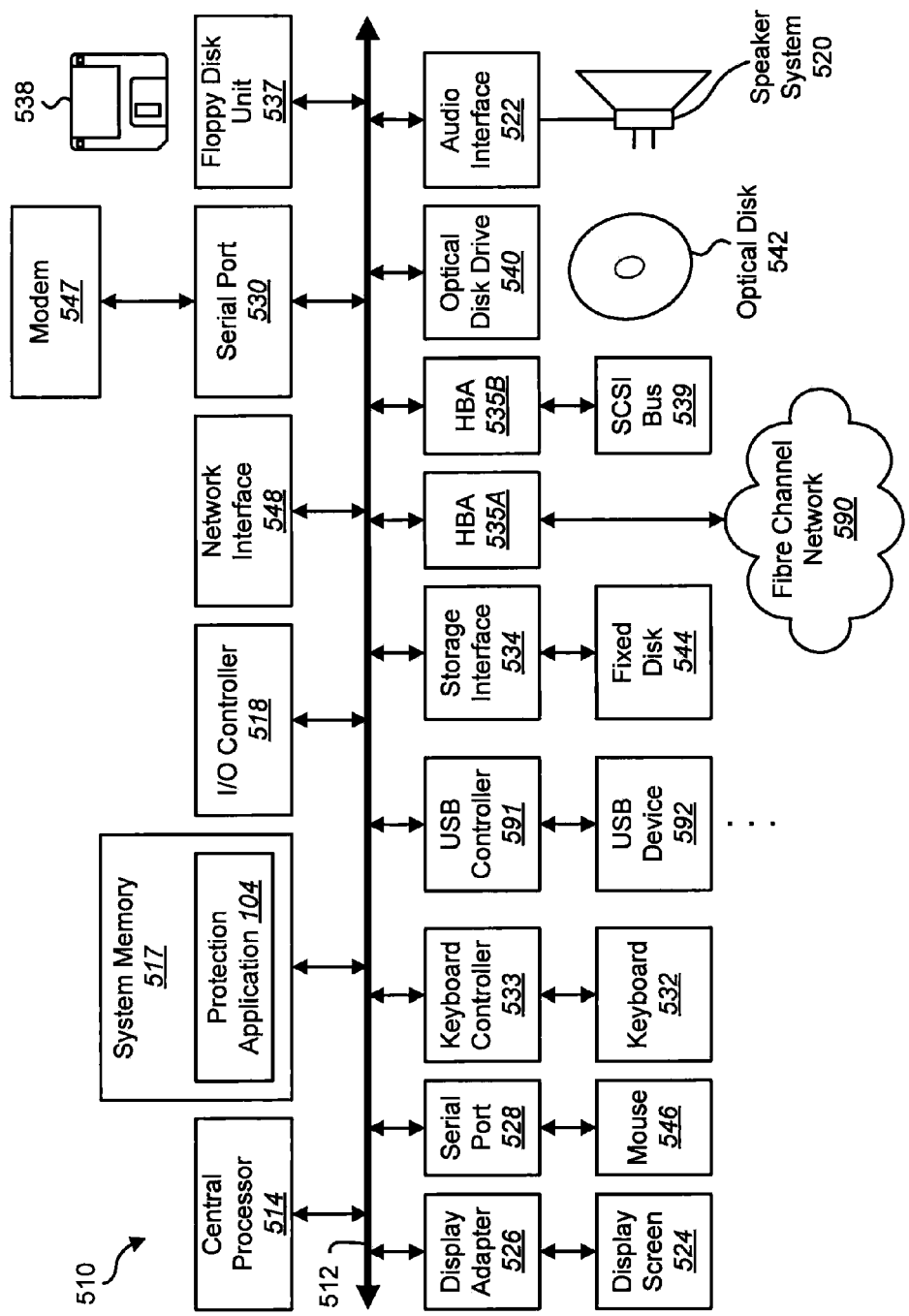
FIG. 5 depicts a block diagram of a computer system suitable for implementing the present systems and methods.

FIG. 5 depicts a block diagram of a computer system 510 suitable for implementing the present systems and methods. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), multiple USB devices 592 (interfaced with a USB controller 590), a storage interface 534, a floppy disk drive 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the protection application 104 to implement the present systems and methods may be stored within the system memory 517. Applications resident with computer system 510 are generally stored on and accessed via a computer readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the present systems and methods. The devices and subsystems can be interconnected in different ways from that shown in FIG. 5. The operation of a computer system such as that shown in FIG. 5 is readily known in the art and is not discussed in detail in this application. Code to implement the present disclosure can be stored in computer-readable medium such as one or more of system memory 517, fixed disk 544, optical disk 542, or floppy disk 538. The operating system provided on computer system 510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
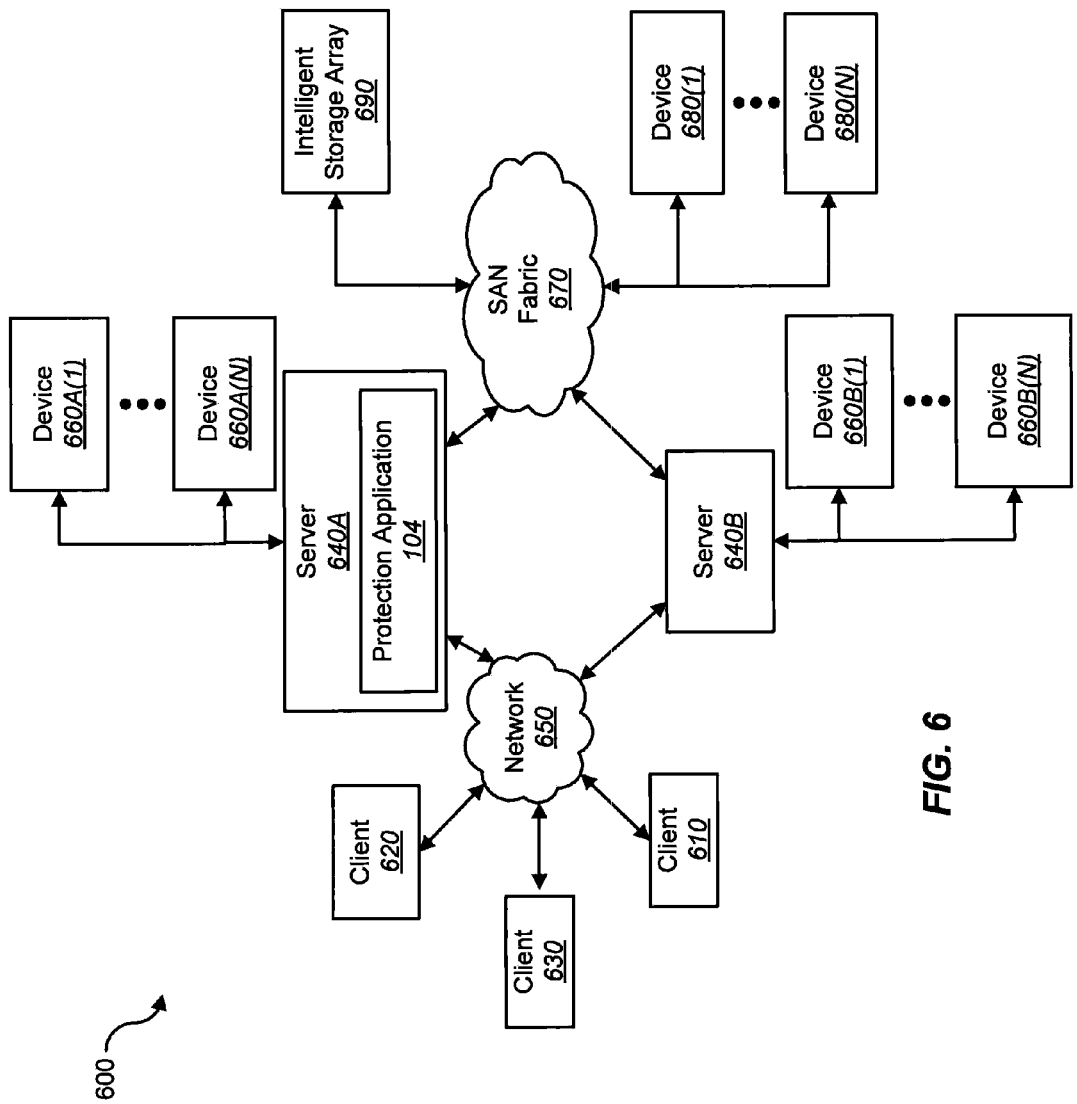
FIG. 6 is a block diagram depicting a network architecture in which client systems, as well as storage servers (any of which can be implemented using computer system), are coupled to a network.

FIG. 6 is a block diagram depicting a network architecture 600 in which client systems 610, 620 and 630, as well as storage servers 640A and 640B (any of which can be implemented using computer system 610), are coupled to a network 650. In one embodiment, the protection application 104 may be located within a server 640A, 640B to implement the present systems and methods. The storage server 640A is further depicted as having storage devices 660A(1)-(N) directly attached, and storage server 640B is depicted with storage devices 660B(1)-(N) directly attached. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620, and 630 to network 650. Client systems 610, 620, and 630 are able to access information on storage server 640A or 640B using, for example, a web browser or other client software (not shown). Such a client allows client systems 610, 620, and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to detect malformed arguments in a function by hooking a generic object, comprising:

identifying, by a processor, a predetermined argument to monitor;

detecting, by the processor, an activity associated with a calling of a function to produce a called out function, the called out function comprising an invoke function;

mapping, by the processor, the called out function to a class identification of an object that called the function;

determining, by the processor, that the class identification of the object corresponds to an interface that created the object;

upon determining that the class identification of the object corresponds to the interface that created the object, comparing, by the processor, an argument in the called out function with the predetermined argument;

when a match exists, recording, by the processor, a virtual method table identification for the called out function;

reporting, by the processor, the match between the argument in the called out function and the predetermined argument; and reporting an identity of the object and the called out function.

2. The method of claim 1, wherein the predetermined argument includes a no-operation performed (NOP) sled.

3. The method of claim 1, wherein the predetermined argument includes shellcode.

4. The method of claim 1, wherein the called out function comprises a JavaScript function.

5. The method of claim 4, wherein the JavaScript function comprises at least one of the following functions: Unescape, Eval, CharCodeAt, Split, or Char.

6. The method of claim 1, wherein the object that called the function comprises an IDispatch interface.

7. A computing device configured to detect malformed arguments in a function by hooking a generic object, comprising:

a processor;

memory in electronic communication with the processor; and instructions stored in the memory, the instructions being executable by the processor to:

identify a predetermined argument to monitor;

detect an activity associated with a calling of a function to produce a called out function, the called out function comprising an invoke function;

map the called out function to a class identification of an object that called the function;

determine that the class identification of the object corresponds to an interface that created the object;

upon determining that the class identification of the object corresponds to the interface that created the object, compare an argument in the called out function with the predetermined argument;

when a match exists, record a virtual method table identification for the called out function;

report the match between the argument in the called out function and the predetermined argument; and report an identity of the object and the called out function.

8. The computing device of claim 7, wherein the predetermined argument includes a no-operation performed (NOP) sled.

9. The computing device of claim 7, wherein the predetermined argument includes shellcode.

10. The computing device of claim 7, wherein the called out function comprises a JavaScript function.

11. The computing device of claim 10, wherein the JavaScript function comprises at least one of the following functions: Unescape, Eval, CharCodeAt, Split, or Char.

12. The computing device of claim 7, wherein the object that called the function comprises an IDispatch interface.

13. A computer-program product for detecting malformed arguments in a function by hooking a generic object, the computer-program product comprising a non-transitory computer-readable medium having instructions thereon, the instructions being executable by a processor to:

identify a predetermined argument to monitor;

detect an activity associated with a calling of a function to produce a called out function, the called out function comprising an invoke function;

map the called out function to a class identification of an object that called the function;

determine that the class identification of the object corresponds to an interface that created the object;

upon determining that the class identification of the object corresponds to the interface that created the object, compare an argument in the called out function with the predetermined argument;

when a match exists, record a virtual method table identification for the called out function;

report the match between the argument in the called out function and the predetermined argument; and report an identity of the object and the called out function.

14. The computer-program product of claim 13, wherein the predetermined argument includes a no-operation performed (NOP) sled.

* * * * *